United States Patent
Deb

(10) Patent No.: US 9,359,265 B2
(45) Date of Patent: Jun. 7, 2016

(54) PLANT NUTRIENT COATED NANOPARTICLES AND METHODS FOR THEIR PREPARATION AND USE

(75) Inventor: Nilanjan Deb, West Bengal (IN)

(73) Assignee: University of Calcutta, Kolkata, West Bengal (IN)

(*) Notice: Subject to any disclaimer, the term of this patent is extended or adjusted under 35 U.S.C. 154(b) by 101 days.

(21) Appl. No.: 13/825,661

(22) PCT Filed: Aug. 7, 2012

(86) PCT No.: PCT/IB2012/001511
§ 371 (c)(1),
(2), (4) Date: Mar. 22, 2013

(87) PCT Pub. No.: WO2013/121244
PCT Pub. Date: Aug. 22, 2013

(65) Prior Publication Data
US 2013/0219979 A1    Aug. 29, 2013

(30) Foreign Application Priority Data
Feb. 15, 2012   (IN) ............................ 154/KOL/2012

(51) Int. Cl.
*C05D 9/02*      (2006.01)
*C05G 3/00*      (2006.01)

(52) U.S. Cl.
CPC ............... *C05D 9/02* (2013.01); *C05G 3/0041* (2013.01)

(58) Field of Classification Search
CPC ............................... C05D 9/02; C05G 3/0041
See application file for complete search history.

(56) References Cited

U.S. PATENT DOCUMENTS

2005/0191231 A1*  9/2005  Sun ............................. 423/632
2009/0229331 A1   9/2009  Wells (Continued)

FOREIGN PATENT DOCUMENTS

CN        1498536 A        5/2004
CN        1589102 A        3/2005
(Continued)

OTHER PUBLICATIONS

Mallick et al. "CO oxidation over gold nanoparticles supported on $TiO_2$ and $TiO_2$—ZnO: catalytic activity effects due to surface modification of $TiO_2$ with ZnO". Applied Catalysis A: General 253 (2003) 527-536.*

(Continued)

*Primary Examiner* — Jennifer A Smith
(74) *Attorney, Agent, or Firm* — Pepper Hamilton LLP

(57) ABSTRACT

Embodiments described herein provide for nanofertilizers having at least one plant nutrient coated onto a metal nanoparticle. Some embodiments provide for a method of making a nanofertilizer including providing a metal nanoparticle and coating the metal nanoparticle with at least one plant nutrient or precursor thereof. In some embodiments, a method of making a nanofertilizer may include mixing a metal salt and a plant nutrient in an aqueous medium to form a solution and adding a reducing agent to the solution to form a coated metal nanoparticle. Some embodiments provide for a boron nanofertilizer and methods of making the same. Some embodiments provide for a method of treating a plant nutrient deficiency, such as, for example, a boron deficiency. Some embodiments also provide for a kit for making a plant nutrient coated nanoparticle.

11 Claims, 17 Drawing Sheets

(56) References Cited

U.S. PATENT DOCUMENTS

Figure 1:
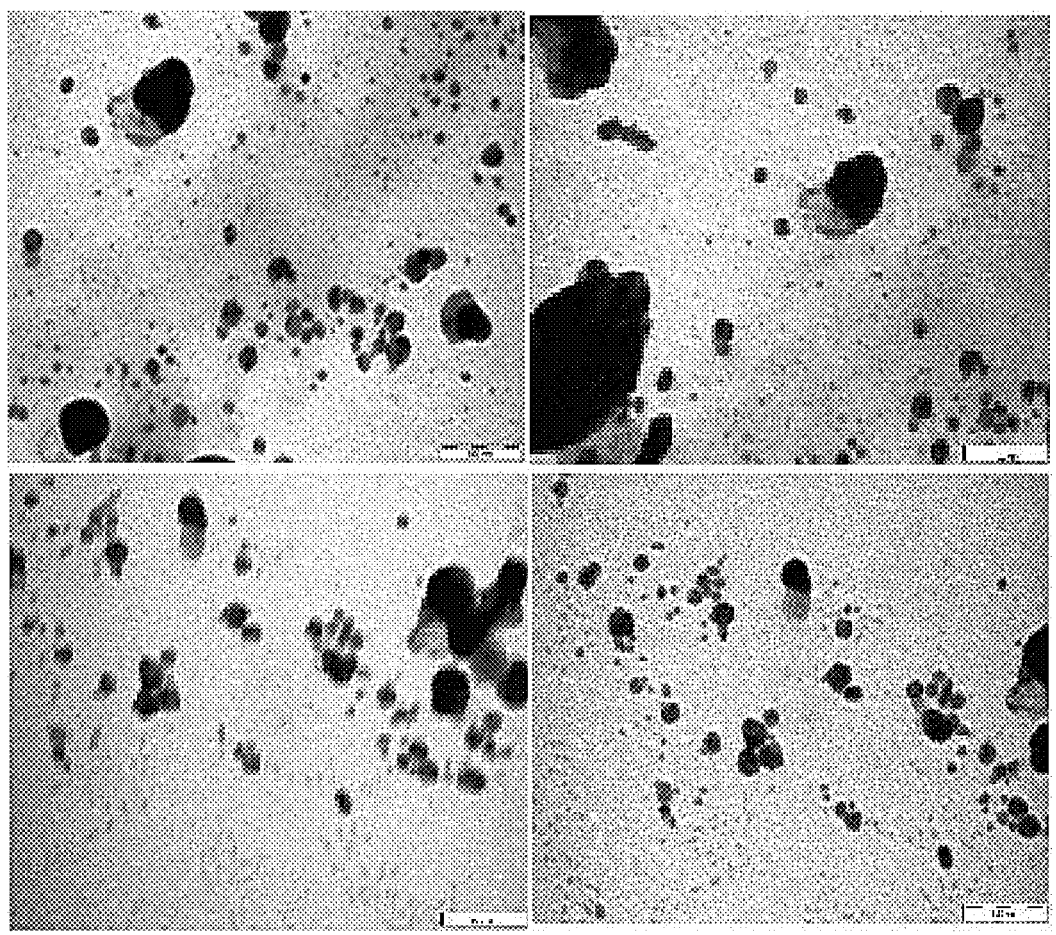

2010/0040556 A1  2/2010  Davis et al.
2011/0117179 A1  5/2011  Karpf

FOREIGN PATENT DOCUMENTS

| CN | 101218092 A | 7/2008 |
|---|---|---|
| CN | 102009184 A | 4/2011 |
| CN | 102205421 A | 10/2011 |

OTHER PUBLICATIONS

Xiangdong et al. "Fabrication of silicon nitride/boron nitride nanocomposite powder". Chinese Science Bulletin 2003 vol. 48 No. 5 430-433.*
International Search Report and Written Opinion for PCT/IB2012/001511 dated Dec. 7, 2012.
Banerji et al., Examination of Nonendocytotic Bulk Transport of Nanoparticles Across Phospholipid Membranes, *Langmuir* (Jan. 30, 2007), 23(6):3305-3313 (Abstract).
Behan et al., Nanoparticles transport across cell membrane, *Paris* (Jun. 22-26, 2009), p. 1 (Abstract).
Brown et al., Boron mobility in plants, *Plant and Soil, Chapter 7* (1997), 193:85-101.
Corredor et al., Nanoparticle penetration and transport in living pumpkin plants: in situ subcellular identification, *BMC Plant Biology* (Apr. 23, 2009), 9(45):1-11.
DeRosa et al., Nanotechnology in fertilizers, *Nature Nanotechnology* (2010), 5:91 (Abstract).
Goldbach, A critical review on current hypotheses concerning the role of boron in higher plants: suggestions for further research and methodological requirements, *Journal of Trace and Microprobe Techniques* (1997), 15(1):51-91 (Abstract).
Goldbach et al., Rapid response reactions of roots to boron deprivation, *J. Plant Nutr. Soil Sci.* (2001), 164:173-181.
Kobayashi et al., Two Chains of Rhamnogalacturonan II Are Cross-Linked by Borate-Diol Ester Bonds in Higher Plan Cell Walls, *Plant Physiol.* (1996), 110:1017-1020.
Loomis et al., Chemistry and biology of boron, *Europe PubMed Central* (1992), 3(4):229-239 (Abstract).
Makkee et al., Studies on borate esters III. Borate esters of *D*-mannitol, *D*-glucitol, *D*-fructose and *D*-glucose in water, *Recueil des Travaux Chimiques des Pays-Bas* (Sep. 2, 2010), 104(9):230-235 (Abstract).
Martens et al., Fertilizer Applications for Correcting Micronutrient Deficiencies, Micronutrients in Agriculture, Second Edition, Chapter 15, SSSA Book Series, No. 4 (1991), pp. 549-553.
Noguchi et al., Defect in Root-Shoot Translocation of Boron in *Arabidopsis thaliana* Mutant *Bor 1-1*, *Journal of Plant Physiology* (May 2000), 156(5-6):751-755 (Abstract).
Oertli et al., The Mechanism of Boron Immobility in Plants, *Physiologia Plantarum* (Apr. 28, 2006), 23(1):108-116 (Abstract).
O'Neill et al., Requirement of Borate Cross-Linking of Cell Wall Rhamnogalacturonan II for *Arabidopsis* Growth, *Science* (Oct. 26, 2001), 294(5543):846-849 (Abstract).
Raven, Short- and Long-Distance Transport of Boric Acid in Plants, *New Phytologist* (Feb. 1980), 84(2):231-249 (Abstract).
Rowe et al., Boron is Required for Zebrafish Embryogenesis, *The Journal of Experimental Biology* (May 20, 1999), 202:1649-1654.
Shelp et al., Boron mobility in plants, *Physiologia Plantarum* (Jun. 1995), 94(2):356-361 (Abstract).
Shvarts et al., Reactions of Polyols with Boric Acid and Sodium Monoborate, *Russian Journal of General Chemistry* (2005), 75(11):1687-1692.

* cited by examiner

6A

6B

8A

8B

PLANT NUTRIENT COATED NANOPARTICLES AND METHODS FOR THEIR PREPARATION AND USE

CROSS-REFERENCE TO RELATED APPLICATIONS

This application is a U.S. national stage filing under 35 U.S.C. §371 of International Application No. PCT/IB2012/001511 filed Aug. 7, 2012 entitled "Plant Nutrient Coated Nanoparticles and Methods for their Preparation and Use," which claims priority to Indian Patent Application No. 154/KOL/2012 filed Feb. 15, 2012, the disclosures of which are hereby incorporated by reference in their entirety.

BACKGROUND

Plants require certain essential nutrients for normal functioning and growth. Nutrient levels outside the amount required for normal functioning and growth may cause overall crop growth and health to decline due to either a deficiency or a toxicity. Nutrient deficiency occurs when an essential nutrient is not available in sufficient quantity to meet the requirements of a growing plant. Toxicity occurs when a nutrient is in excess of plant needs and decreases plant growth or quality.

Plant nutrients are divided into two categories: macronutrients, which are consumed in larger quantities and may be present in plant tissue in quantities from about 0.2% to about 4.0% by dry matter weight; and micronutrients, which are consumed in smaller quantities and may range from about 5 parts per million (ppm) to about 200 ppm or less than about 0.2% dry weight. Macronutrients include carbon, hydrogen, oxygen, phosphorus, potassium, nitrogen, sulfur, calcium, magnesium, and silicon. Micronutrients include iron, molybdenum, boron, copper, manganese, sodium, zinc, nickel, chlorine, selenium, vanadium and cobalt.

There are three fundamental ways plants uptake nutrients through the root: (1) simple diffusion, where a nonpolar molecule, such as, for example, $O_2$, $CO_2$, and $NH_3$ that follow a concentration gradient, can passively move through the lipid bilayer membrane without the use of transport proteins; (2) facilitated diffusion, where the rapid movement of solutes or ions following a concentration gradient is facilitated by transport proteins; and (3) active transport, in which the active transport of ions or molecules against a concentration gradient requires an energy source, usually ATP, to pump the ions or molecules through the membrane.

However, not all plant nutrients are equally mobile. For example, boron is generally considered to be phloem immobile or to have only limited phloem mobility in higher plants. The mobility of boron from outside the plant cell to inside the plant cell typically involves mediation by a boron polyol complex. Polyol compounds, however, may not be present sufficiently or may be totally absent in higher plants. Thus, in most commercial field crops and horticultural crops (which lack polyol), boron's mobility is restricted and boron fertilization is limited. Thus, there is a need for a more mobile and efficient nutrient fertilization method in plants.

SUMMARY

Some embodiments described in this document relate to a nanofertilizer including at least one plant nutrient coated onto a metal nanoparticle. In some embodiments, the at least one plant nutrient includes nitrogen, phosphorous, potassium, calcium, sulfur, magnesium, boron, copper, iron, chloride, manganese, molybdenum, zinc, a precursor thereof or a combination thereof. In some embodiments, the at least one plant nutrient includes boron, boric acid, disodium octaborate tetrahydrate, calcium borate, magnesium borate, sodium borosilicate, sodium tetraborate decahydrate, sodium borate, sodium tetraborate, disodium tetraborate or a combination thereof. In some embodiments, the metal nanoparticle includes gold, silver, copper, aluminum, nickel, chromium, iron, cobalt, tin, titanium, silicon, zinc, lead, platinum, palladium, rhodium, tantalum, ruthenium, tungsten, an alloy thereof or a combination thereof.

Some embodiments described in this document relate to a method of making a nanofertilizer which includes providing a metal nanoparticle; and coating the metal nanoparticle with at least one plant nutrient or a plant nutrient precursor. In some embodiments, providing the metal nanoparticle includes forming the metal nanoparticle through salt reduction synthesis, reverse micelles process, microwave dielectric heating reduction, ultrasonic irradiation, radiolysis, solvothermal synthesis, bioreduction, heat evaporation, photochemical reduction, electrochemical synthesis, or a combination thereof.

Some embodiments described in this document relate to a method of making a nanofertilizer which includes mixing a metal salt and a plant nutrient in an aqueous medium to form a solution; and adding a reducing agent to the solution to form a coated metal nanoparticle. In some embodiments, the reducing agent is added to the solution in a dropwise manner. In some embodiments, the reducing agent includes sodium citrate, sodium borohydride, hydroquinone, glycol ethylene, formaldehyde, ethanol, hydroxyl radicals, sugar pyrolysis radicals, hydrazine hydrate, saccharide, N,N-dimethylformamide or a combination thereof.

In some embodiments, the method also includes heating the solution before adding the reducing agent. The solution may be heated to a temperature of about 70° C. to about 110° C. In some embodiments, the method also includes adding a stabilizer to the solution after adding the reducing agent. The stabilizer may include polyvinyl alcohol, polyethylene glycol, carboxymethyl cellulose, poly(vinylpyrrolidone), sodium dodecyl sulphate, long-chain thiol, long-chain amines, carboxylic compounds, bovine serum albumin, citrate, cellulose, or a combination thereof.

Some embodiments described in this document relate to a method of making a boron nanofertilizer, the method comprising adding silver nitrate and boric acid to an aqueous medium to form a solution; and adding a reducing agent to the solution to form a boric acid coated silver nanoparticle. In some embodiments, the reducing agent includes sodium citrate. In some embodiments, the aqueous medium includes water.

Some embodiments described in this document relate to a method for treating boron deficiency in a plant comprising administering a metal nanoparticle coated with boron or a precursor thereof to the plant. In some embodiments, the coated metal nanoparticle is administered as a spray, hydroponics, aeroponics, seed treatment, seedling root dipping, soil application, nutrient for tissue culture, in vitro culture, application with irrigation water or a combination thereof. The coated metal nanoparticle may be administered in an amount effective to treat boron deficiency. The coated metal nanoparticle may be administered in an amount without causing boron toxicity.

Some embodiments described in this document relate to a kit for making a plant nutrient coated metal nanoparticle which includes a metal salt; a plant nutrient; and a reducing agent. The kit may also include an aqueous medium. In some embodiments, the kit also includes a delivery apparatus to deliver the plant nutrient coated metal nanoparticle to a plant. In some embodiments, the delivery apparatus is a spraying apparatus.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 1 illustrates transmission electron microscopy images of boric acid coated silver nanoparticles at different stages of release of boric acid from the surface of silver nanoparticles.

FIG. 2 illustrates phase contrast microscopic images of (a) boric acid coated silver nanoparticle absorption through leaf epidermis; (b), (c), (d), (e), (f) transport of boric acid coated silver nanoparticle through vascular bundles at different stages.

FIG. 3 illustrates penetration of boric acid coated silver (Ag—B) core shell nanoparticles across leaf cuticle, stomata and potato leaves.

FIG. 4 illustrates a comparison between an Ag—B nanoparticle treated leaf (left—dark green) and a leaf treated with macro-boric acid (right—lighter green).

FIG. 5 illustrates Ag—B nanofertilizer concentrations and macro-boric acid concentrations in various treatments.

FIG. 6 illustrates boron concentration in leaf at different growth stages sprayed with Ag—B nanofertilizers (left) and boron concentration in leaf and stem (just 1 cm above root) during various growth stages (right).

FIG. 7 illustrates that a trace amount of boron (<2 ppm) has been found in tubers under all treatments.

FIG. 8 illustrates chlorophyll a and chlorophyll b content in potato leaves measured at 15 and 30 days after spraying Ag—B nanofertilizer.

FIG. 9 illustrates total plant weight (aerial part), total tuber yield and total biomass of potato under various concentrations of Ag—B nanofertilizers (q-ha=quintals/hectare).

FIG. 10 illustrates dry weight of tubers per 100 grams of fresh weight, ash content (percentage) of leaf and stem of Ag—B nanofertilizer treated potato plants.

FIG. 11 illustrates biochemical analysis of potato tubers for starch, soluble sugar, reducing sugar content after 30 days in cold storage.

FIG. 12 illustrates a solution of silver nanoparticles stabilized by sodium dodecyl sulphate (SDS) (left) and a solution of silver particles coated with boric acid (right).

FIG. 13 illustrates UV-VIS spectra of (a) silver nanoparticles stabilized by SDS and (b) Ag—B nanoparticles.

FIG. 14 illustrates transmission electron microscopy images of silver nanoparticles stabilized with sodium dodecyl sulphate (SDS) (upper) and Ag—B nanoparticles (lower).

FIG. 15 illustrates the particle size distribution of Ag—B NP from Zeta analyzer.

FIG. 16 illustrates a potato leaf sprayed with Ag—B nanofertilizer (left) and a leaf sprayed with macro boric acid (right).

DETAILED DESCRIPTION

In the following detailed description, reference is made to the accompanying drawings, which form a part of this document. In the drawings, similar symbols typically identify similar components, unless the context dictates otherwise. The illustrative embodiments described in the detailed description, drawings, and claims are not meant to be limiting. Other embodiments may be used, and other changes may be made, without departing from the spirit or scope of the subject matter presented in this document. It will be readily understood that the aspects of the present disclosure, as generally described in this document, and illustrated in the Figures, can be arranged, substituted, combined, separated, and designed in a wide variety of different configurations, all of which are explicitly contemplated to be within the scope of this disclosure.

Some embodiments are directed to plant nutrient coated metal nanoparticles and methods of making and using such nanoparticles. Nanoparticles are capable of penetrating living plant tissues and migrating to different regions of the plant. Use of such nanoparticles for nanofertilization may transport the plant nutrient to the plant cell plasma membrane, without the need for any additional energy and exhibits no phytotoxicity. The coated metal nanoparticle may be capable of transport across a plant membrane system without mediation of complex polysaccharides and without ATP energy from the plant. The coated metal nanoparticle may be used as a foliar spray, seed treatment, root dipping, soil application in precision farming, glass house farming, applying with irrigation water and as plant nutrient in tissue culture or any in vitro culture media for micropropagation and regeneration of plants.

Some embodiments disclosed in this document relate to a nanofertilizer including at least one plant nutrient coated onto a metal nanoparticle. The nanofertilizer may be in an aqueous solution. Owing to a high surface area to volume ratio, the effectiveness of such nanofertilizers may surpass the most innovative polymer-coated conventional fertilizers, which have seen little improvement in the past ten years.

Some embodiments relate to a method of making a nanofertilizer including the steps of providing a metal nanoparticle and coating the metal nanoparticle with at least one plant nutrient or a precursor thereof. Providing the metal nanoparticle may include forming the metal nanoparticle through salt reduction synthesis, reverse micelles process, microwave dielectric heating reduction, ultrasonic irradiation, radiolysis, solvothermal synthesis, bioreduction, heat evaporation, photochemical reduction, electrochemical synthesis, or a combination thereof.

The at least one plant nutrient of embodiments herein may include nitrogen, phosphorous, potassium, calcium, sulfur, magnesium, boron, copper, iron, chloride, manganese, molybdenum, zinc, a precursor thereof or a combination thereof. In some embodiments, the plant nutrient may be boron, boric acid, disodium octaborate tetrahydrate, calcium borate, magnesium borate, sodium borosilicate, sodium tetraborate decahydrate, sodium borate, sodium tetraborate, disodium tetraborate or a combination thereof. In some embodiments, the plant nutrient may include lime, gypsum, superphosphate, iron sulfate, iron chelate, ferritin, zinc oxide, zinc sulfate, zinc chelate, potassium nitrate, calcium nitrate, magnesium nitrate, monoammonium phosphate, ammonium sulfate, magnesium sulfate, monopotassium phosphate, calcium carbonate, ammonium nitrate sulfate, ammonium thiosulfate, aqua ammonia, calcium cyanamide, crotonylidene diurea, diacyandiamide, isobutylidene diurea, sodium nitrate, potassium carbonate, potassium chloride, potassium magnesium sulfate, potassium metaphosphate, potassium sulfate, calcium chloride, calcium oxide, calcitic limestone, dolomitic limestone, magnesium ammonium phosphate, magnesium oxide, copper chelates, cupric ammonium phosphate, copper sulfate, copper frits, copper polyflavonoid, malachite, azurite, cuprous oxide, cupric oxide, cupric acetate, boric acid, sodium tetraborate, sodium tetraborate decahydrate, boron frit, sodium borosilicate, calcium borate, magnesium borate, sodium borate, disodium octaborate tetrahydrate, disodium tetraborate, ferric sulfate, ferrous sulfate, ferrous ammonium sulfate, ferrous ammonium phosphate, ferrous oxalate, ferrous carbonate, iron chelate, iron lignosulfonate, iron polyflavonoid, iron frits, iron methoxyphenylpropane, ferrous oxide, ferric oxide, iron ammonium polyphosphate, manganese oxide, manganese methoxyphenyl propane, manganese frits, manganese chloride, manganese carbonate, manganese sulfate, manganese chelate, manganese ammonium phosphate, manganese polyflavonoid, ammonium molybdate, sodium molybdate, molybdenum frit, molybdenum trioxide, molybdenum sulfide, zinc frit, zinc carbonate, zinc phosphate, zinc ammonium phosphate, zinc sulfide, zinc lignosulfonate, zinc polyflavonoid or a combination thereof.

In some embodiments, the metal nanoparticle may include gold, silver, copper, aluminum, nickel, chromium, iron, cobalt, tin, titanium, silicon, zinc, lead, platinum, palladium, rhodium, tantalum, ruthenium, tungsten, an alloy thereof or a combination thereof. In particular embodiments, the nanoparticle may be silver. In some embodiments, the nanoparticle may be copper. In some embodiments, the nanoparticle may be gold. In some embodiments, the nanoparticle may include a size of about 1 nm to about 100 nm.

Some embodiments described in this document provide for a boron nanofertilizer including boron or a precursor thereof coated onto a metal nanoparticle. Boron is an element which plays a vital role in various metabolic and biochemical activities in plants and animals. Boron is considered to be involved in nucleic acid metabolism, carbohydrate and protein metabolism, indole acetic acid metabolism, cell wall synthesis, cell wall structure, membrane integrity and function, and phenol metabolism; however, the molecular basis of these roles is mostly unknown.

It is believed that the boric acid nanoparticles of embodiments herein may be transported through the plant cell plasma membrane, without the need for any additional energy, and exhibits no phytotoxicity. Boric acid is a compound containing boron, hydrogen and oxygen in 3:1:3 proportions.

Compared to the conventional boric acid or Borax fertilizers, all of which are on the macro scale (on the order of micrometers) ("macro boric acid"), the boron nanofertilizer of embodiments herein (on the order of nanometers) shows a sharp increase in crop yield (increased biomass, potato tuber yield, and plant weight) and crop quality (less reducing sugar and increased starch content). Accordingly, one benefit of the boron nanofertilizer described in embodiments may be extremely low cost and high efficiency. Some embodiments described herein provide a highly effective means of nanofertilization by administration of boric acid nanoparticles to plants. Nanoscale boric acid released from the surface of metal nanoparticles of embodiments herein can be a highly efficient boron fertilizer. Other benefits of the boron coated metal nanoparticles described herein include increased boron content in plants resulting in increased chlorophyll content, number of leaves, total biomass, total yield, and lowered soluble and reducing sugars.

Some embodiments relate to a method of making a nanofertilizer including the steps of mixing a metal salt and a plant nutrient in an aqueous medium to form a solution; and adding a reducing agent to the solution to form a coated metal nanoparticle. In some embodiments, the reducing agent may be added to the solution in a dropwise manner.

In some embodiments, the metal salt includes a metal selected from gold, silver, copper, aluminum, nickel, chromium, iron, cobalt, tin, titanium, silicon, zinc, lead, platinum, palladium, rhodium, tantalum, ruthenium, tungsten, an alloy thereof or a combination thereof. In some embodiments, the metal salt includes a salt selected from a chloride, fluoride, acetate, sulfate, nitrate, carbonate, nitrite, citrate, cyanide, hydroxide, oxide, phosphate or a combination thereof. In particular embodiments, the salt may be silver nitrate. In some embodiments, the salt may be copper sulfate. In some embodiments, the salt may be gold chloride. In some embodiments, the aqueous medium may be water.

In some embodiments, the reducing agent comprises sodium citrate, sodium borohydride, hydroquinone, glycol ethylene, formaldehyde, ethanol, hydroxyl radicals, sugar pyrolysis radicals, hydrazine hydrate, saccharide, N,N-dimethylformamide or a combination thereof. In some embodiments, the reducing agent may be sodium citrate. In some embodiments, the reducing agent may be sodium borohydride.

The solution may be heated before adding the reducing agent. In some embodiments, the solution may be further heated to a temperature of about 70° C. to about 110° C. before adding the reducing agent. In embodiments, the solution may be heated to a temperature of about 70° C. to about 100° C., about 70° C. to about 95° C., about 70° C. to about 90° C., about 70° C. to about 85° C., about 75° C. to about 110° C., about 75° C. to about 100° C., about 75° C. to about 95° C., about 75° C. to about 90° C., about 75° C. to about 85° C., about 80° C. to about 110° C., about 80° C. to about 100° C., about 80° C. to about 95° C., about 80° C. to about 90° C., about 80° C. to about 85° C., a combination thereof or the like. Specific examples include about 70° C., about 75° C., about 80° C., about 85° C., about 90° C., about 95° C., about 100° C., and ranges between any two of these values.

In some embodiments, a stabilizer may be added to the solution after adding the reducing agent. The stabilizer may include polyvinyl alcohol, polyethylene glycol, carboxymethyl cellulose, poly(vinylpyrrolidone), sodium dodecyl sulphate, long-chain thiol, long-chain amines, carboxylic compounds, bovine serum albumin, citrate, cellulose, or a combination thereof.

Figure 4:
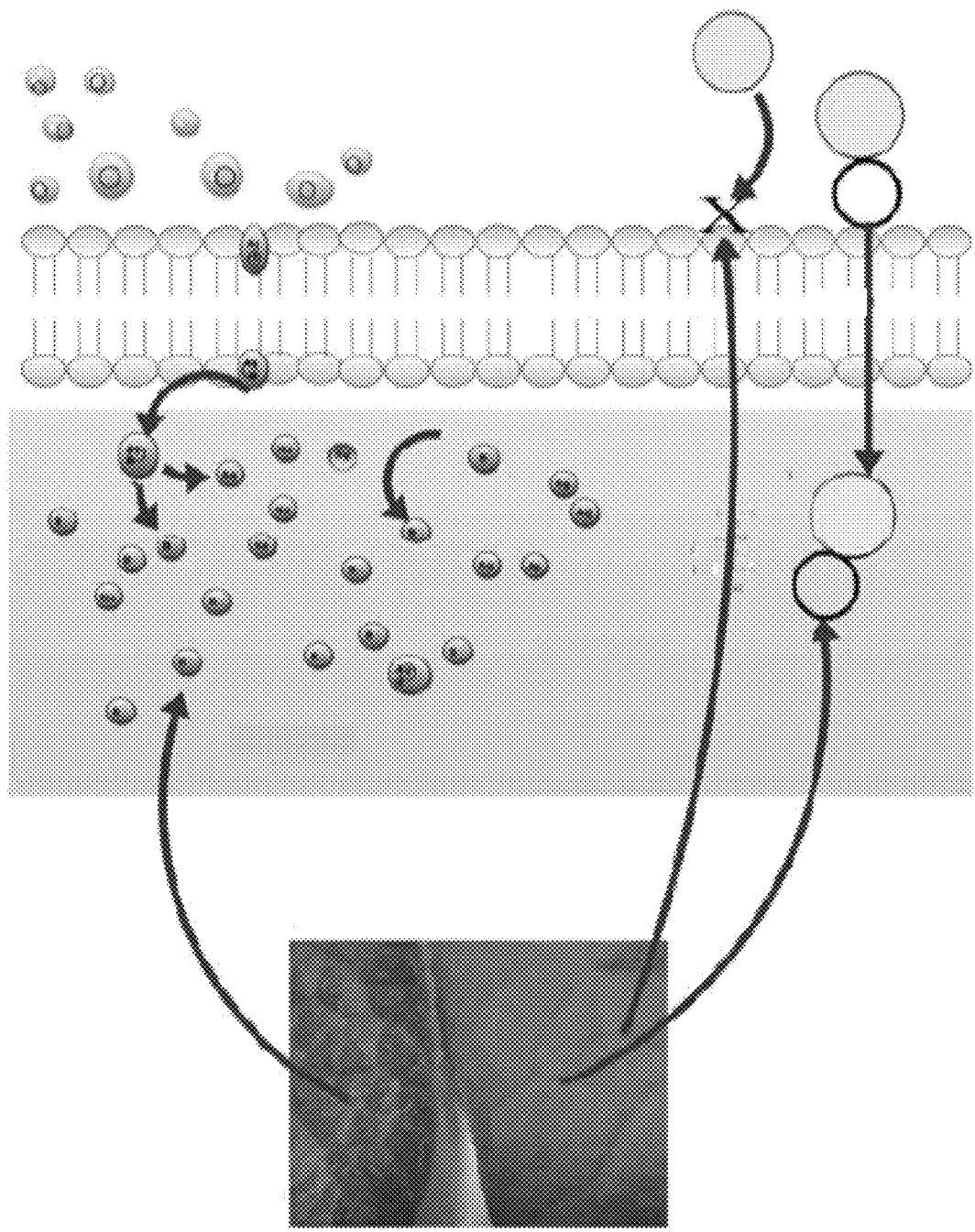

Some embodiments of this document provide for the synthesis of boric acid coated metal core shell nanoparticles (NP), their delivery into plants, and smart uptake by a non-mediated transport through the plasma membrane into the cell without making a polyol complex. It is believed that two types of compounds with polyols are formed in solutions of boric acid. See Raven J A (1980) Short- and long-distance transport of boric acid in plants, New Phytologist 84: 231-249 and Rowe R I, Eckhert C D (1999) Boron is required for zebrafish embryogenesis, J Exp Bot 202:1649-1654. As seen in FIG. 4, the metal nanoparticles (left side) act as catalysts for movement of nanofabricated plant nutrients across the cell membrane.

Some embodiments provide for a method of making a boron nanofertilizer including adding a metal salt and boric acid to an aqueous medium to form a solution; and adding a reducing agent to the solution to form a boric acid coated metal nanoparticle.

In some embodiments, nanofabrication of essential plant nutrient nanofertilizer and its application methods may be achieved at very low doses. In some embodiments, the concentration of boron in the nanofertilizer may be about $1/100000^{th}$ or less than the boron concentration of the conventional macro boric acid solution, and may result in as much as a 111% increase in potato tuber yield. In some embodiments, the boron concentration in the nanofertilizer may be about 0.001 ppm to about 2.0 ppm, about 0.001 ppm to about 1.5 ppm, 0.001 ppm to about 1.0 ppm, 0.001 ppm to about 0.5 ppm, 0.001 ppm to about 0.1 ppm, 0.001 ppm to about 0.05 ppm, about 0.01 ppm to about 2.0 ppm, about 0.01 ppm to about 1.5 ppm, about 0.01 ppm to about 1.0 ppm, 0.01 ppm to about 0.5 ppm, 0.01 ppm to about 0.1 ppm, 0.01 ppm to about 0.05 ppm, a combination thereof or the like. Specific examples, without limitation, of boron concentration in the nanofertilizer may include about 0.062 ppm, about 0.0465 ppm, about 0.0300 ppm, about 0.0248 ppm, about 0.0186 ppm, about 0.0124 ppm, about 0.0062 ppm, and ranges between any two of these values.

Some embodiments of this document also provide for a method of treating a plant nutrient deficiency. In some embodiments, the method includes administering a metal nanoparticle coated with at least one plant nutrient or a precursor thereof to the plant. In some embodiments, the coated metal nanoparticle is administered in an amount such that it is effective to treat the plant nutrient deficiency without causing toxicity.

In some embodiments, the coated metal nanoparticle may be administered as a spray, hydroponics, aeroponics, seed treatment, seedling root dipping, soil application, tissue culture, in vitro culture, application with irrigation water or a combination thereof. In some embodiments, the coated metal nanoparticle is administered as a foliar spray.

Some embodiments are related to a kit for making a plant nutrient coated metal nanoparticle which includes a metal salt, a plant nutrient and a reducing agent. The plant nutrient coated nanoparticle may be in an aqueous medium. In some embodiments, the kit may further include a delivery apparatus for delivering the plant coated metal nanoparticle to the plant. In some embodiments, the delivery apparatus is a spraying apparatus.

EXAMPLE 1

Preparation of Boric Acid Coated Nanoparticle Fertilizers using Sodium Citrate as a Reducing Agent Silver-boric acid nanostructures were prepared in aqueous medium by reduction synthesis method. 100 mM $AgNO_3$ and 100 mM boric acid ($H_3BO_3$) stock solutions and 2% w/v dibasic sodium citrate solution were prepared; 50 ml double distilled water was taken in 100 ml Erlenmeyer flask and heated while stirring near boiling ~80° C. 500 µL of 100 mM $AgNO_3$ was added to it and heated to 80° C., and stirred for nearly 1 minute. Then 500 µL of 100 mM boric acid solution was added to it. The solution was heated and stirred for 2 minutes. 2% w/v sodium citrate was added to the solution drop by drop. The solution was heated until the color change was evident (pale yellow).

Figure 13A:
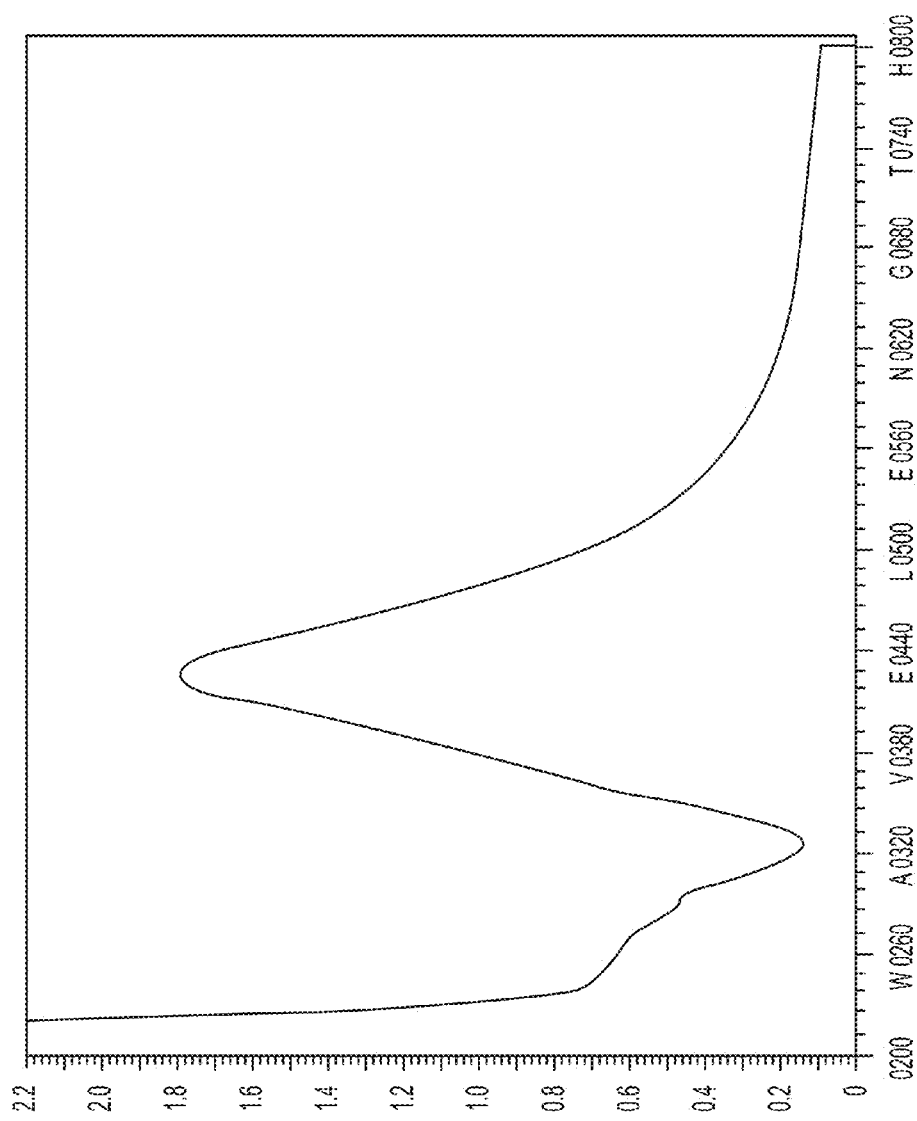
Figure 13B:
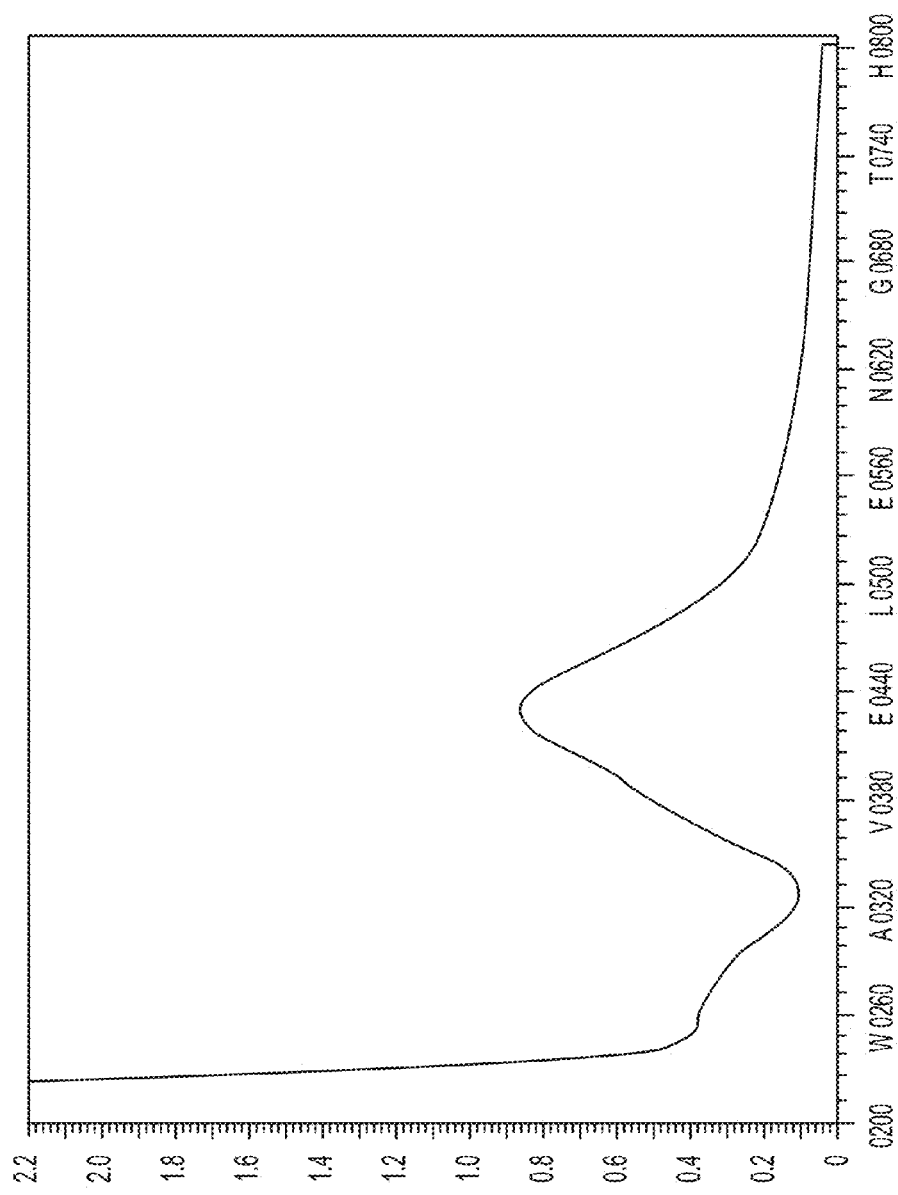
Figure 14:
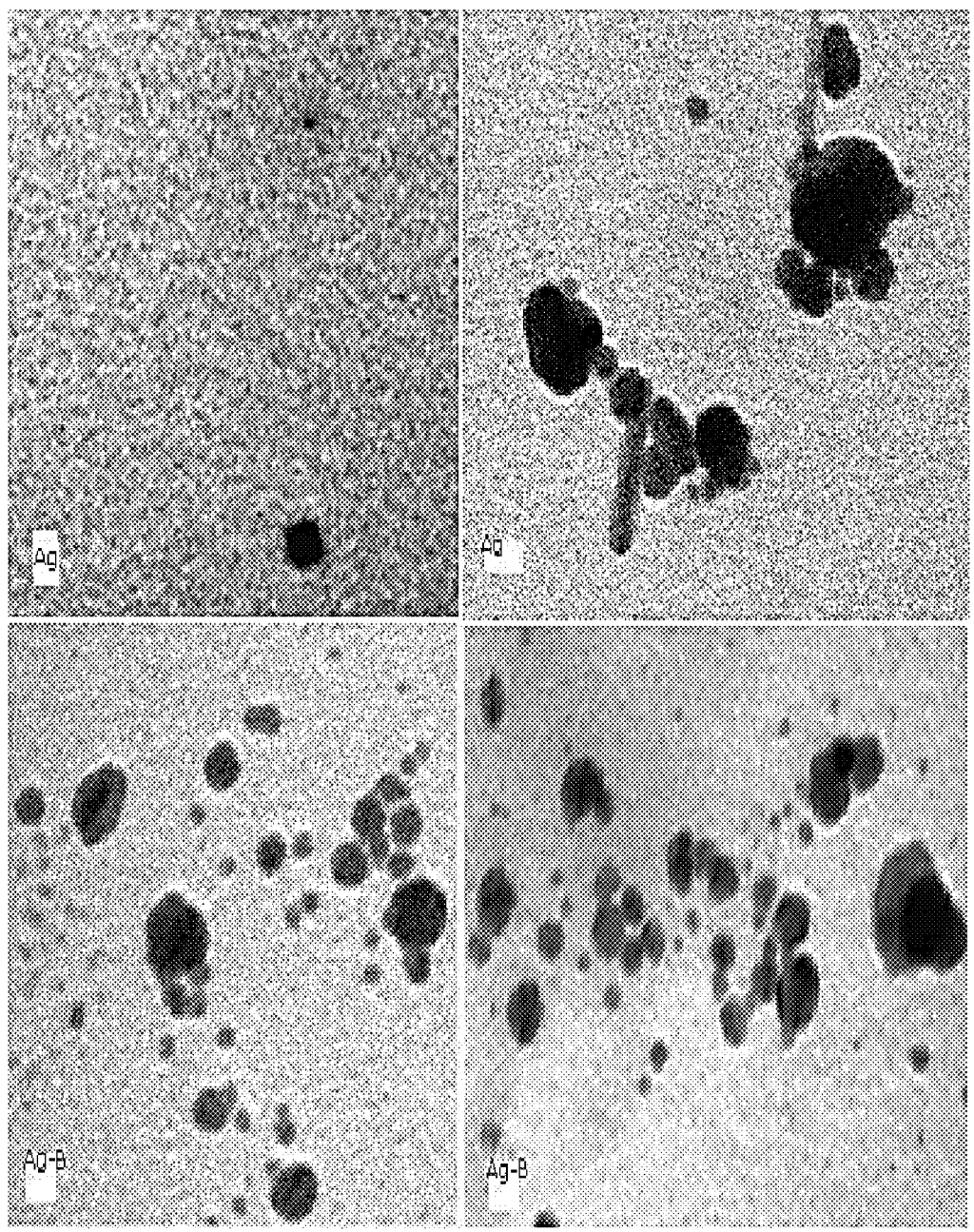
Figure 15:
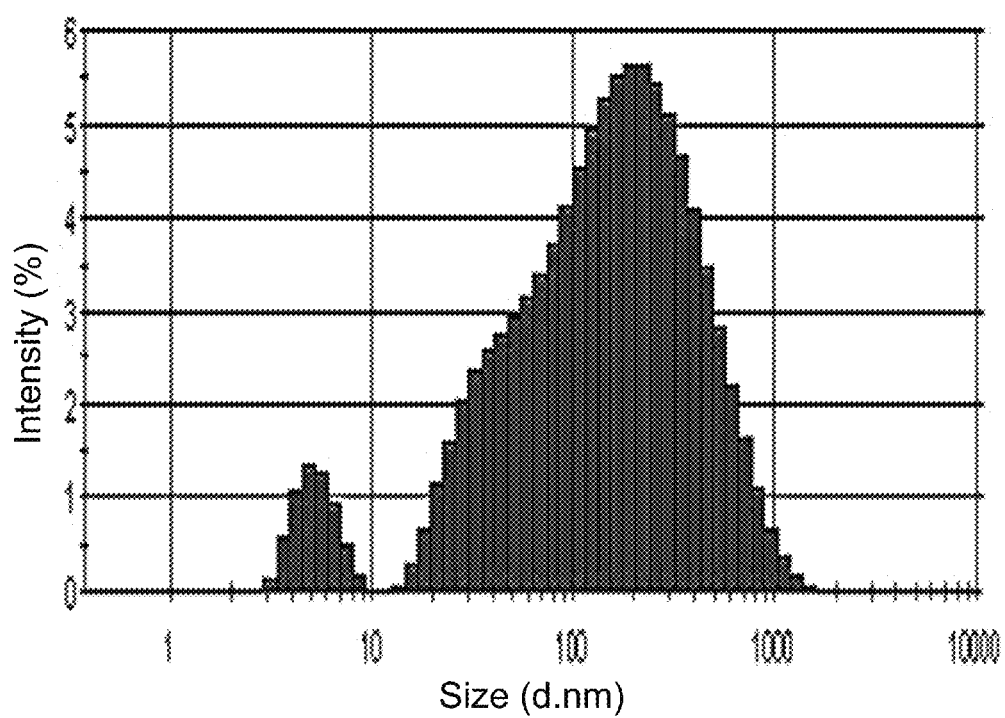

Then the temperature was reduced and the solution was stirred for 50 minutes to room temperature. The prepared transparent, pale yellow solution was kept in the freezer for further characterization by UV-VIS spectrophotometer (FIG. 13), Zeta analyzer (FIG. 15), transmission electron microscope (TEM) (FIG. 14). As shown in FIG. 14, the TEM images of the Ag—B nanoparticles show a visible coating of boric acid.

As shown in FIG. 1, the transmission electron microscopy images illustrated that the rate of release depends on various factors: concentration of boric acid as coating agent, total time and temperature during synthesis. The boric acid started releasing 24-48 hours after spraying on foliage. Under normal temperature conditions, the coated nanoparticles may be stored for at least months.

Figure 2:
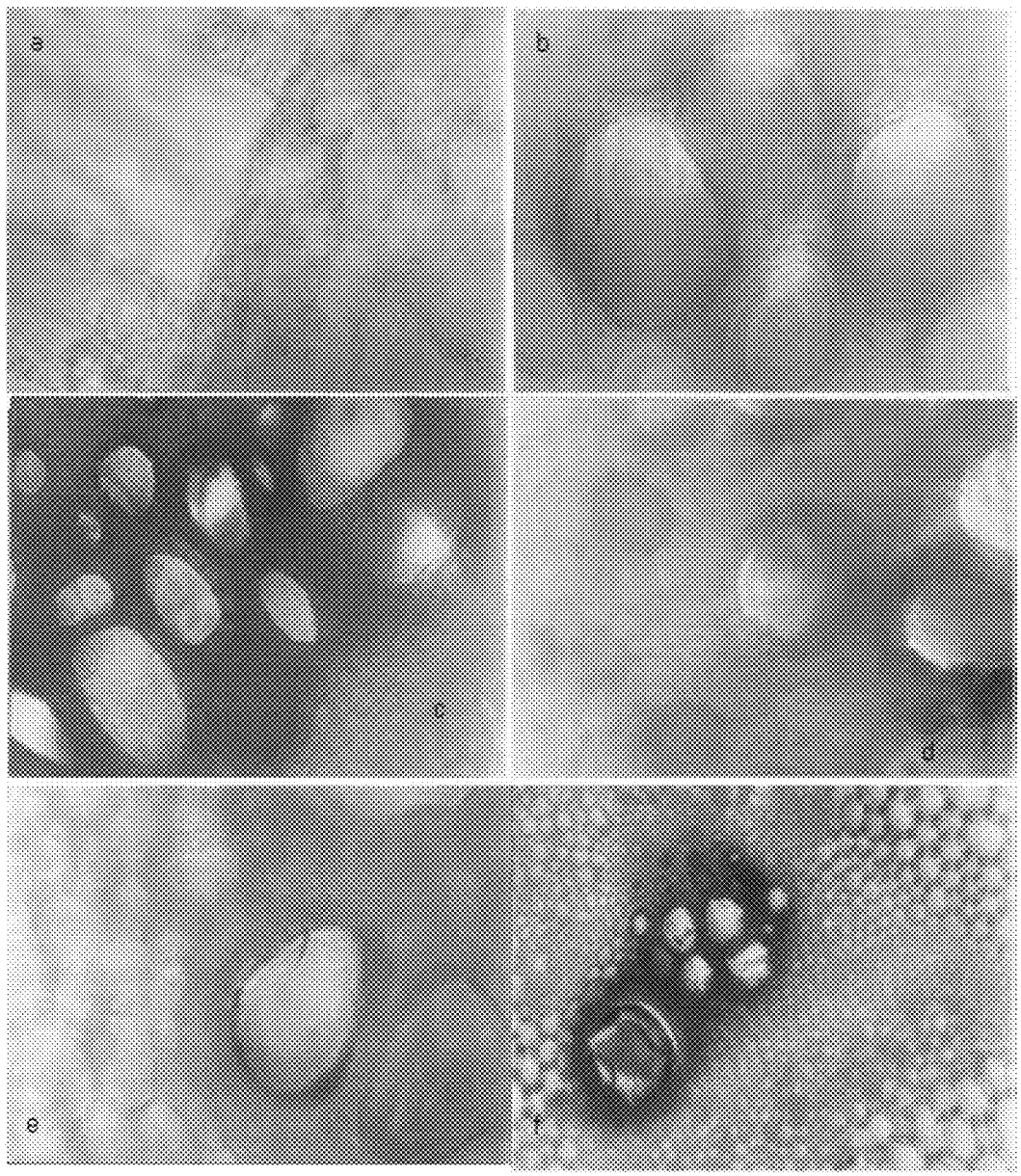
Figure 3:
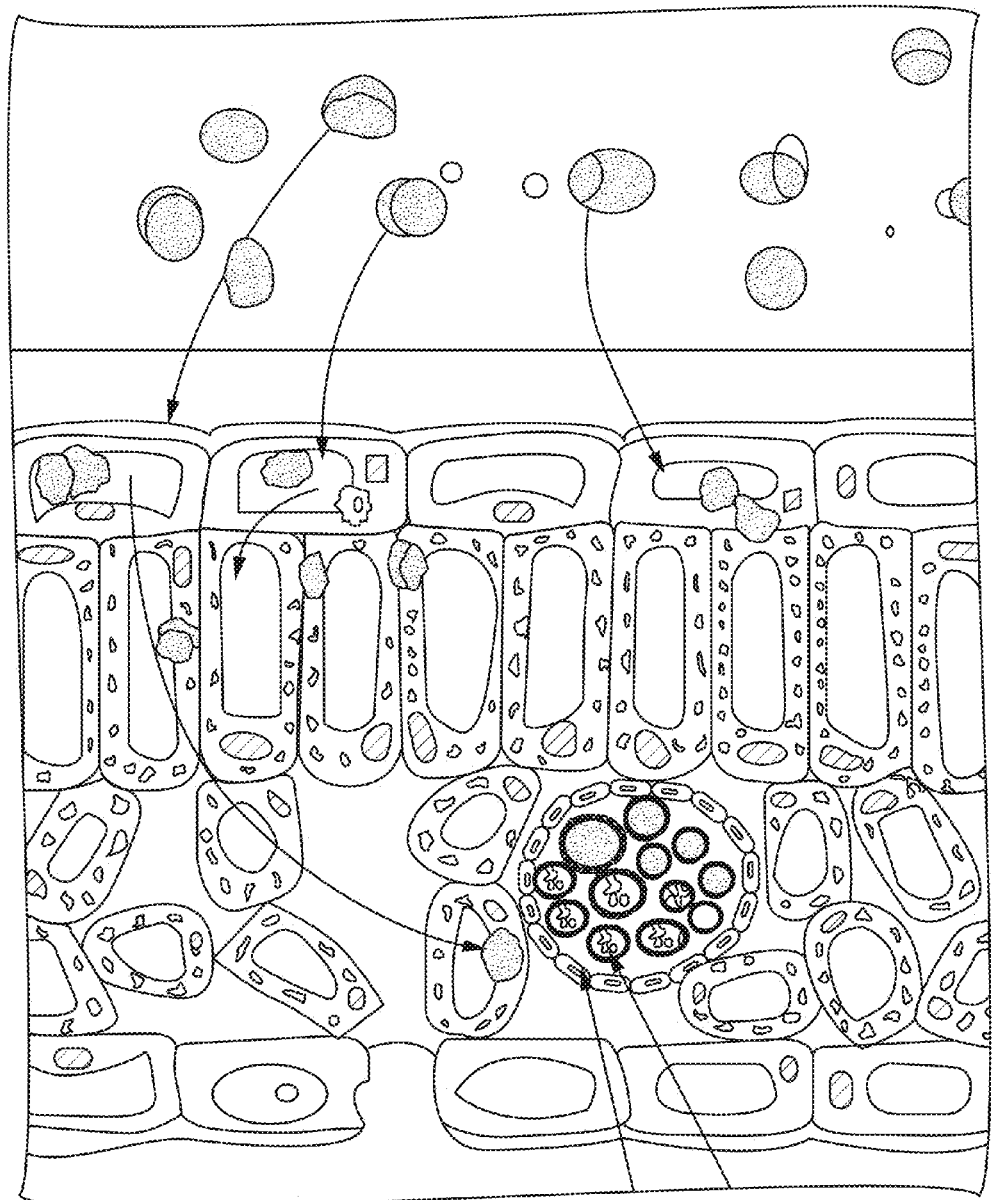

As shown in FIG. 2 illustrating the phase contrast microscopy images, it is believed that the delivered nanofabricated boron nutrients are transported through the plasma membrane of the plant cell by effusion requiring no energy or minimal energy, not by diffusion. Boron is an essential plant nutrient but its mobility in plants is greatly unresolved—although it is known that some plants are boron mobile and some are extremely immobile causing acute boron deficiency disorders. It is believed that the boric acid coated silver nanoparticles (size 10-1000 nm) are able to readily transport across plant membrane system without the mediation of complex polysaccharides, as required by macro boric acid treatment. FIGS. 3 and 4 illustrate the mode of transport of nonpolar nutrient nanoparticles through the plant plasma membrane with no energy requirement from ATP in the cell. FIG. 3 illustrates the penetration of boric acid coated silver core shell nanoparticles across leaf cuticle, stomata of potato plants. FIG. 4 illustrates the differences in membrane transport of boric acid coated silver (left side) nanoparticles (which does not require polyol mediation) and macro-size boric acid (right side) (which can't enter the cell without complexing with mannitol). It is believed that the metal nanoparticles act as catalysts for movement of nanofabricated plant nutrients across the plant cell membrane. As shown in FIG. 4, the potato leaf (left) treated with Ag—B nanoparticle (0.062 ppm concentration of nano boric acid treatment) is a deep green color compared to macro boric acid ($6.2 \times 10^3$ ppm concentration boric acid) sprayed on potato leaf (right). FIG. 4 clearly shows that a 100,000 times lower concentration of nano-boric acid has a much higher efficacy than macro boric acid. (See also FIG. 8 on chlorophyll concentrations under different treatments).

EXAMPLE 2

Preparation of Boric Acid Coated Nanoparticle Fertilizers using Sodium Borohydride as a Reducing Agent Silver-boric acid nanostructures were prepared in aqueous medium by reduction synthesis method. 500 µL of 100 mM $AgNO_3$ was added to 50 ml double distilled water and heated to 80° C., and stirred for nearly 1 minute. Then 500 µL of 100 mM boric acid solution was added to it. The solution was heated and stirred for 2 minutes. 0.75M sodium borohydride solution was added to the solution drop by drop. The solution was heated until the color change was evident (pale yellow). Then the temperature was reduced and the solution was stirred for 50 minutes to room temperature. It was found that sodium borohydride reduced Ag—B showed no toxicity on treated rice plants (data not shown).

EXAMPLE 3

Improved Crop Productivity from Application of Boric Acid Nanoparticles

Figure 5:
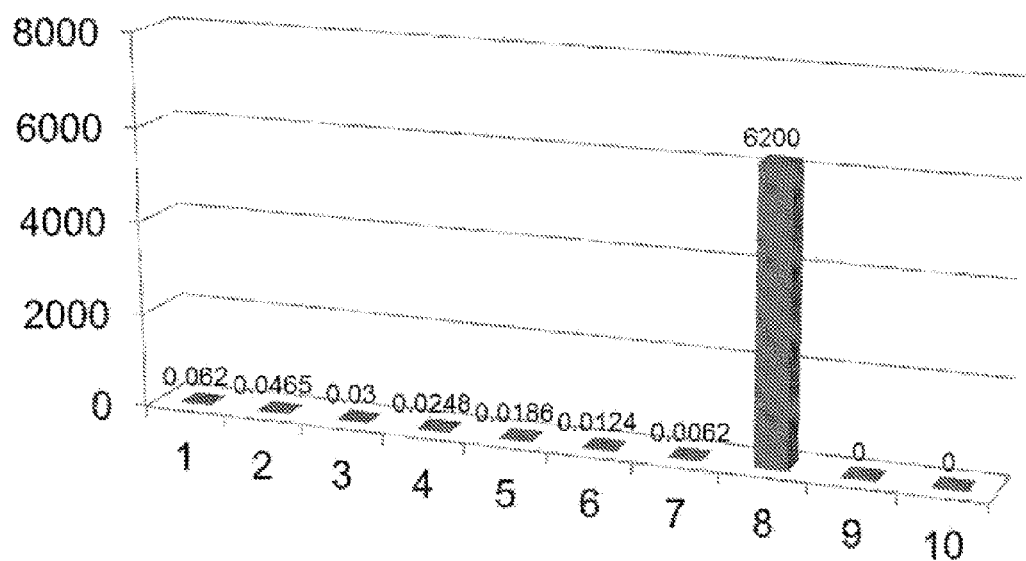

Boric acid coated silver nanoparticles (Ag—B NP) were applied to potato crops as a foliar spray and, 45 days after spraying, the growth attributes, yield components, and quality parameters of the potato (Solanum tuberosum) crop were evaluated. A boric acid (BA) macro particle spray (0.62% w/v), containing approximately $6.2 \times 10^3$ ppm BA, and various concentrations of Ag—B nanoparticles (nanofertilizer) containing 0.062 ppm, 0.0465 ppm, 0.0300 ppm, 0.0248 ppm, 0.0186 ppm, 0.0124 ppm, 0.0062 ppm of boric acid were also evaluated (see Table 1 below). FIG. 5 illustrates the different boric acid concentrations in the different Ag—B nanofertilizer treatments (T1-T7) as well as the macro boric acid concentration (T8), silver nanoparticle (T9) and control (T10). The boric acid removable coating on the silver nanoparticles eventually released from the surface of the silver nanoparticle inside the plant tissue and boric acid was made available as nanonutrient to penetrate directly into cell membrane without making a boron-polyol complex.

TABLE 1

| Treatment | Boric Acid (BA) conc. in spray | Composition | Particle Size |
|---|---|---|---|
| T1 | 0.062 ppm | BA coated on Ag-NP | <100 nm |
| T2 | 0.0465 ppm | BA coated on Ag-NP | <100 nm |
| T3 | 0.03 ppm | BA coated on Ag-NP | <100 nm |
| T4 | 0.0248 ppm | BA coated on Ag-NP | <100 nm |
| T5 | 0.0186 ppm | BA coated on Ag-NP | <100 nm |
| T6 | 0.0124 ppm | BA coated on Ag-NP | <100 nm |
| T7 | 0.0062 ppm | BA coated on Ag-NP | <100 nm |
| T8 | 6200 ppm | Macro BA | >8000 nm |
| T9 | 0 ppm | Only Silver NP | <100 nm |
| T10 | 0 ppm | Control | No B |

Figure 6:
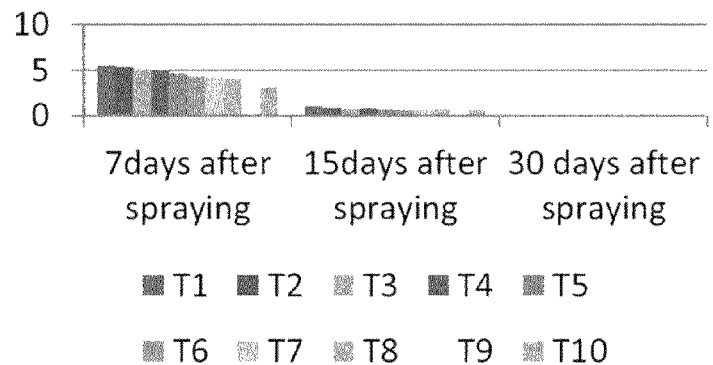
Figure 6:
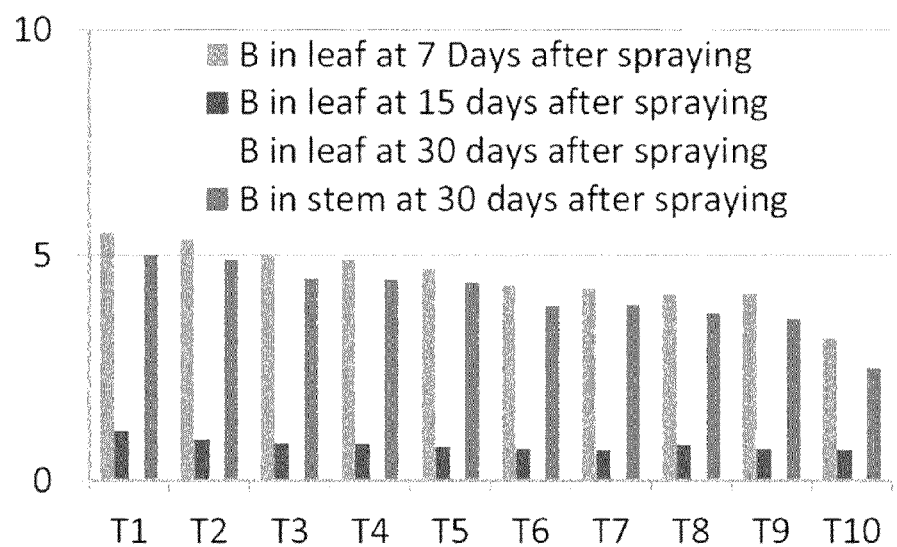
Figure 7:
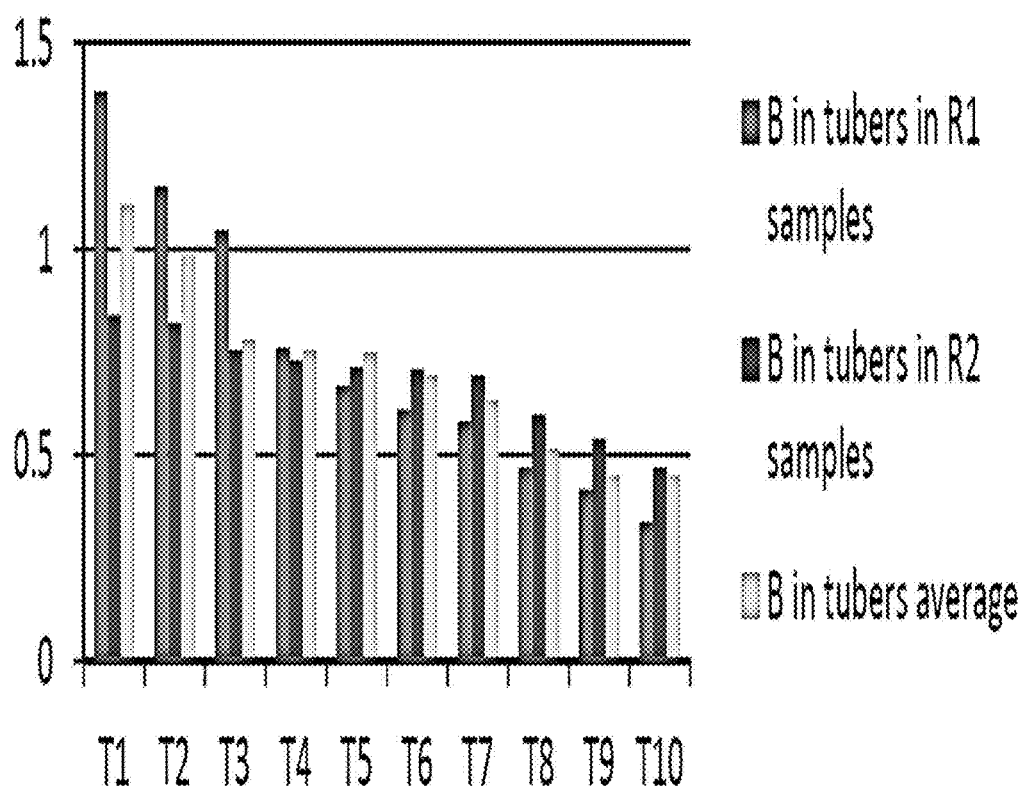

Boric acid coated silver nanoparticles had significant effect on growth parameters like plant height, leaf numbers, chlorophyll content, total biomass, dry matter accumulation, fresh weight, tuber yield; along with quality parameters like decrease in soluble and reducing sugar, increase in starch and tuber ash percentage with nanofertilizer concentrations. As shown in FIG. 6, boron concentrations in leaf and tuber significantly increased when sprayed with Ag—B nanofertilizers compared to macro boric acid (T8). There was 100,000 times higher boron concentration in spray solution than nanofertilizer. Ag—B nanofertilizer concentrations sprayed on foliage transported from leaves to stem and younger leaves. Within 15 days of spraying almost 80% of boron transported from leaves to other parts. At 30 days after spraying trace amount of boron was found in leaf but 90% of boron was found to be deposited in basal portion of stem (1 cm above root level). Therefore, boron concentration in stem increased with a gradual decline in boron concentration in leaf (compare boron concentrations at 30 days in leaf and stem in FIG. 6). A trace amount of boron (<2 ppm) was found in potato tubers under all treatments as shown in FIG. 7.

Figure 8:
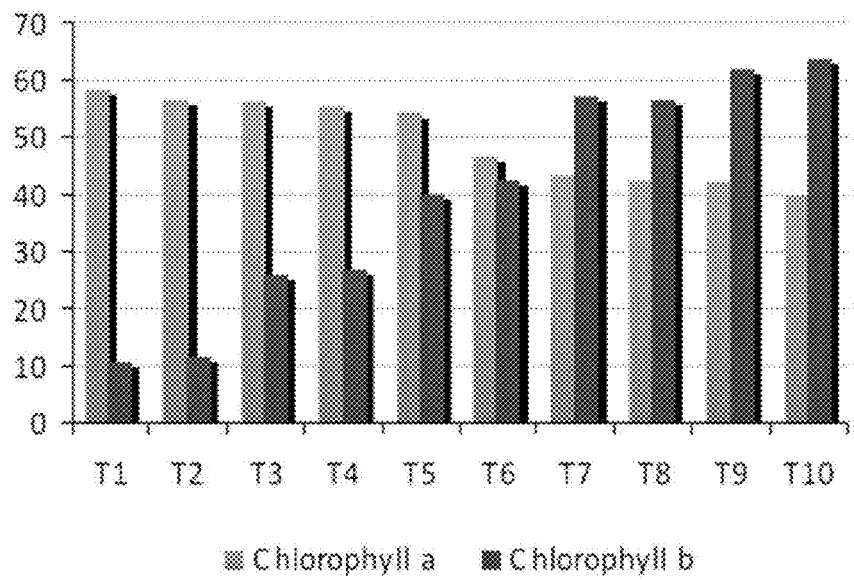
Figure 8:
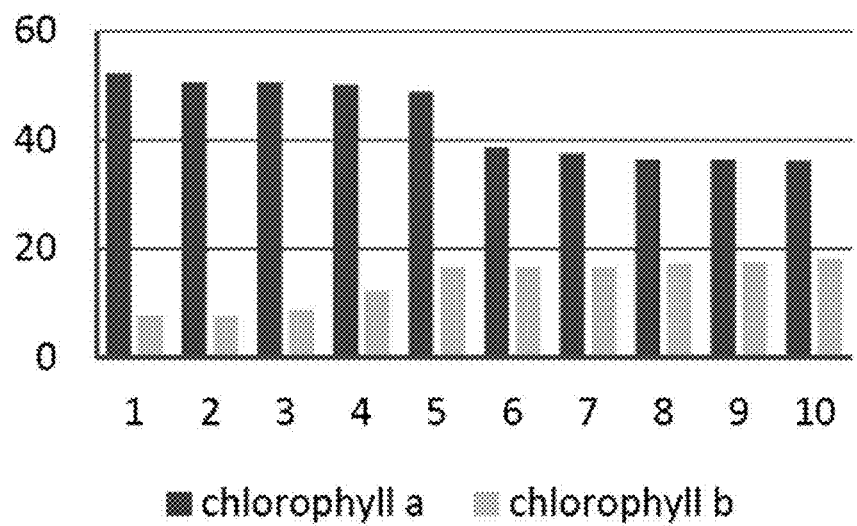
Figure 9:
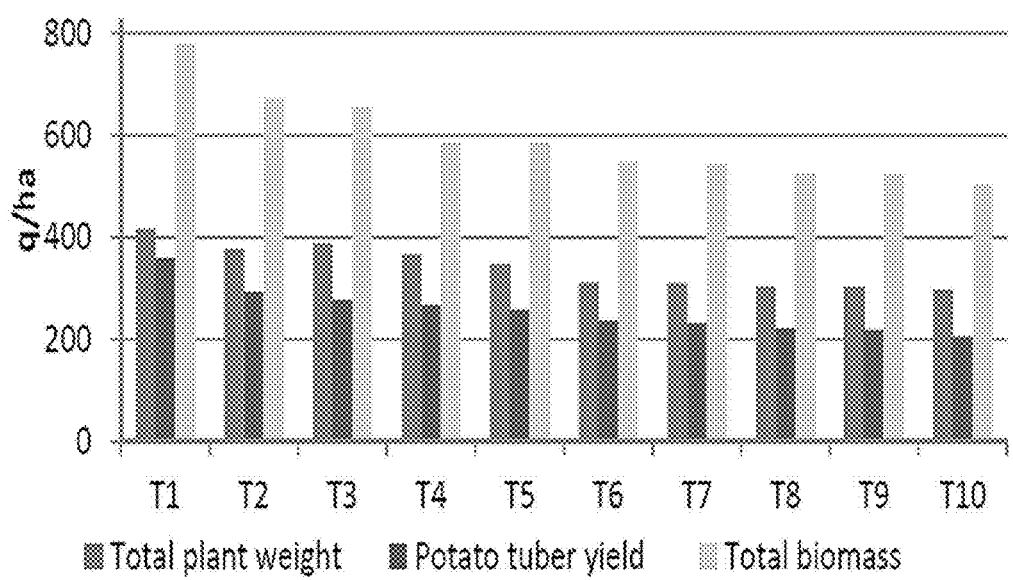
Figure 10:
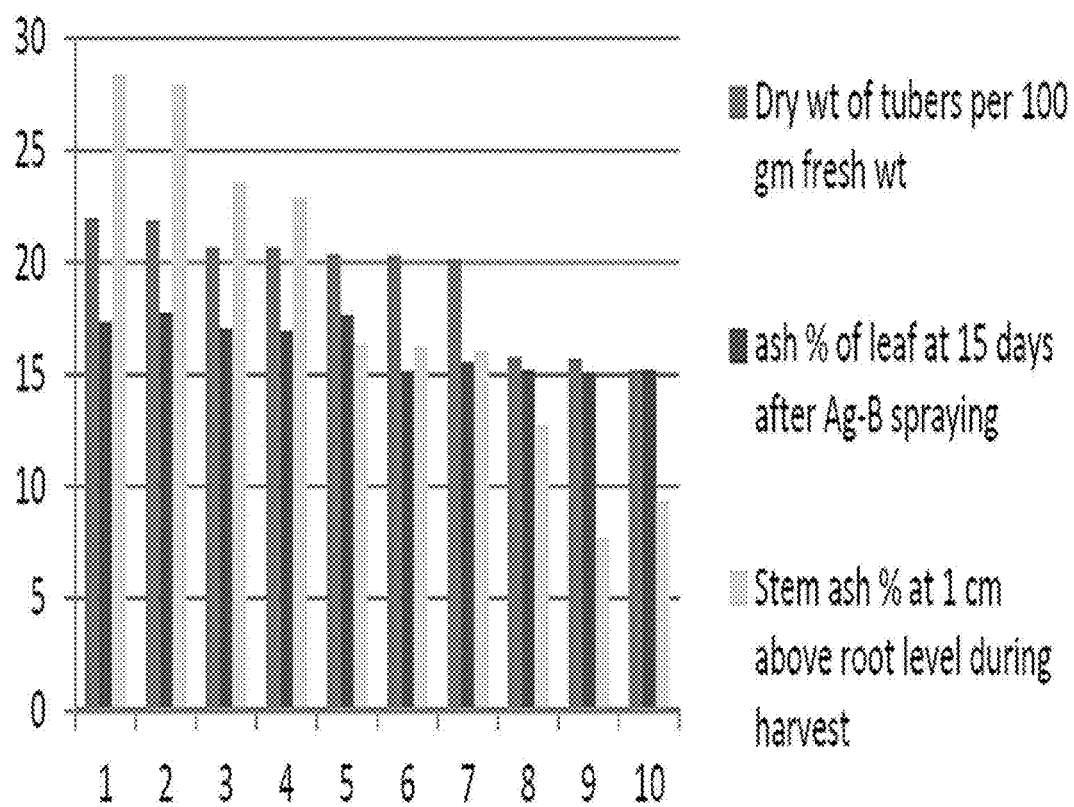
Figure 11:
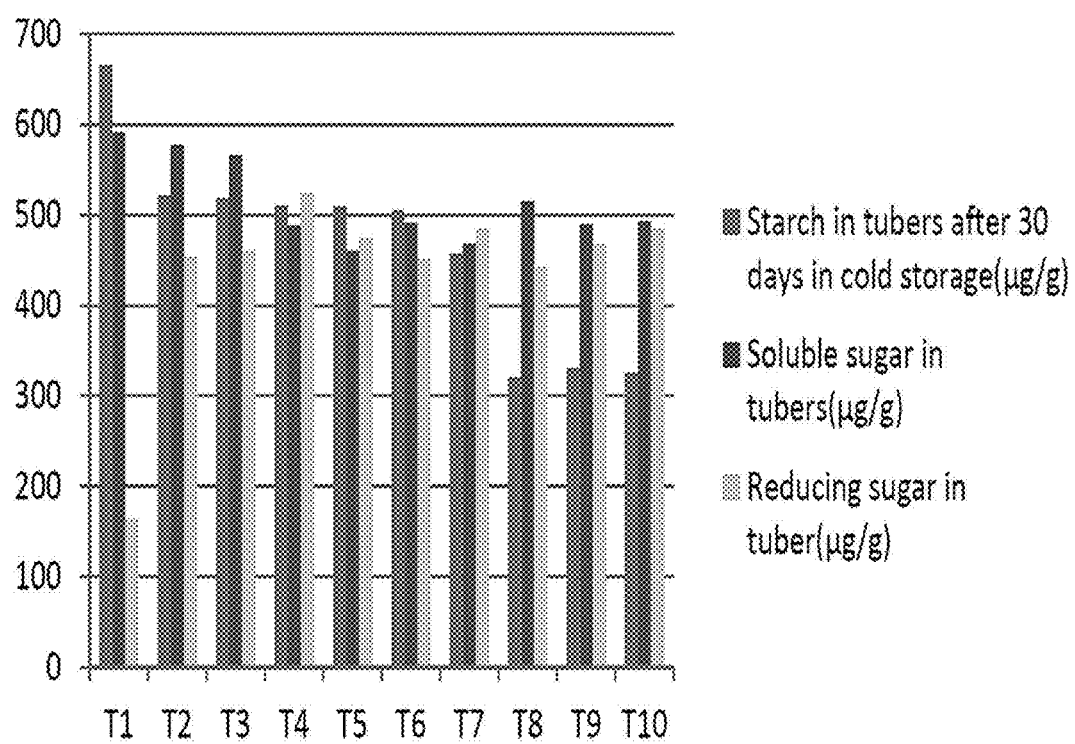
Figure 16:

As shown in FIG. 8, chlorophyll a content in Ag—B nanofertilizer treated leaves increased at both stages of growth (15 days and 30 days), but macro boric acid (T8) was as good as without treatment. Most significantly, Ag—B nanofertilizer spray had reduced chlorophyll b content with increasing dose of nanofertilizer. As shown in FIG. 9, it is clearly visible that total plant weight (above ground), tuber yield and total biomass were increased with nanofertilizer application. Macro boric acid (column T8 in FIG. 9) is no better than control (without spray). Similarly SDS stabilized silver nanoparticles may have no effect on the above parameters. All measured plant growth parameters, yield attributes and quality parameters were significantly better with the Ag—B nanofertilizer treatments. Furthermore, as seen in FIG. 16, potato leaves sprayed with Ag—B nanofertilizer (left) showed a dark green, fleshy, undulated and hairy leaf in comparison with a macro boric acid sprayed potato leaf (right) which showed a light green colored leaf. When dry weight of tubers per 100 gm of fresh weight, ash content of leaf and stem of Ag—B nanofertilizer treated potato plants was determined, as shown in FIG. 10, it was determined that maximum tuber dry matter was found from T1 and T2 respectively. Biochemical analysis of potato tubers for starch, soluble sugar, reducing sugar content after 30 days in cold storage, seen in FIG. 11, showed high starch and low reducing sugar in Ag—B nanofertilizer treated potato samples (T1 only) whereas all other treatments were equivalent. However starch content was increased in all nanofertilizer treated samples.

Figure 12:
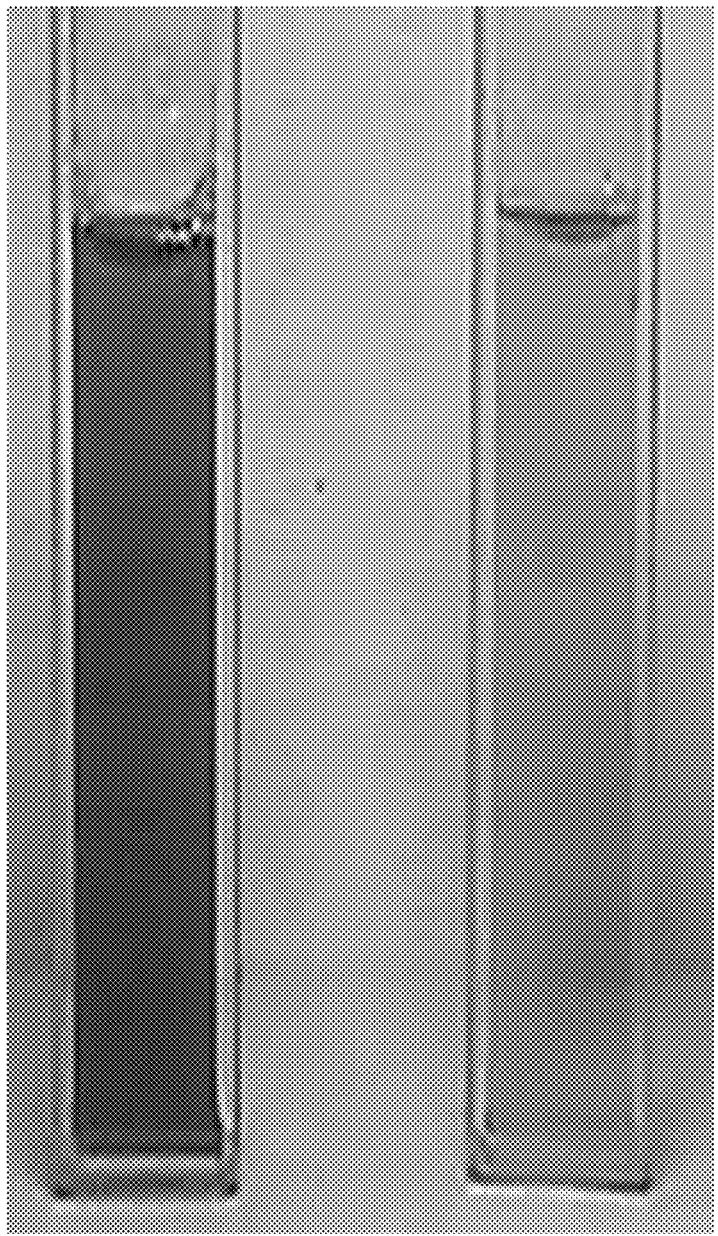

Silver nanoparticles were synthesized using sodium dodecyl sulphate as stabilizer, which was also sprayed on the crop foliage (T9) at the time of application of other treatments, but there was no detectable response to silver nanoparticle coated with SDS. Therefore it is believed that all effects produced by nanofertilizer were due to boric acid. As shown in FIG. 12, the color of Ag nanoparticles coated with boric acid is pale yellow (right side of FIG. 12) and lighter in color compared to Ag nanoparticles stabilized by SDS (sodium dodecyl sulphate, left side of FIG. 12). As the data presented above shows, the proposed Ag—B nanofertilizer is unique and it increases the productivity of the resulting crop by at least 100 times and improves the quality (less reducing sugar and increased starch content) of the produce.

EXAMPLE 4

Preparation of Boric Acid Coated Nanoparticle Fertilizers using Copper Sulfate as the Metal Salt Copper-boric acid (Cu—B) nanostructures were prepared in aqueous medium by reduction synthesis method. $CuSO_4$ was added to sodium borohydride at room temperature and stabilized by polyvinylpyrrolidone(PVP) to synthesize Cu—B nanoparticles.

Cu—B nanoparticles were sprayed on foliage at flowering stage of rice. Panicle weight, number of grains, and grain weight of treated plants were recorded. Cu—B treated plants gave higher yield of rice than control (data not shown). However, it is believed that because copper is also a micronutrient for plant, the results may be additive effect of copper and boron.

EXAMPLE 5

Preparation of Boric Acid Coated Nanoparticle Fertilizers using Gold Chloride as the Metal Salt Gold-boric acid (Au—B) nanostructures were prepared in aqueous medium by reduction synthesis method. Gold chloride ($Au_2Cl_6$) was heated in an aqueous medium and added to sodium borohydride. The reaction was stabilized by adding polyethylene glycol (PEG) to synthesize Au—B nanoparticles.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated in this document, will be apparent to those skilled in the art from the foregoing descriptions. Such modifications and variations are intended to fall within the scope of the appended claims. The present disclosure includes the full scope of equivalents to which the claims are entitled. It is to be understood that this disclosure is not limited to particular methods, reagents, compounds, compositions or biological systems, which can, of course, vary. It is also to be understood that the terminology used in this document is for the purpose of describing particular embodiments only, and is not intended to be limiting.

With respect to the use of substantially any plural and/or singular terms in this document, those having skill in the art can translate from the plural to the singular and/or from the singular to the plural as is appropriate to the context and/or application. The various singular/plural permutations may be expressly set forth in this document for sake of clarity.

It will be understood by those within the art that, in general, terms used in this document, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed in this document also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed in this document can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 bonds refers to groups having 1, 2, or 3 bonds. Similarly, a group having 1-5 bonds refers to groups having 1, 2, 3, 4, or 5 bonds, and so forth.

From the foregoing, it will be appreciated that various embodiments of the present disclosure have been described in this document for purposes of illustration, and that various modifications may be made without departing from the scope and spirit of the present disclosure. Accordingly, the various embodiments disclosed in this document are not intended to be limiting, with the true scope and spirit being indicated by the following claims.

What is claimed is:

1. A nanofertilizer comprising at least one nanoscale plant nutrient coated onto a metal nanoparticle, wherein the plant nutrient is ammonium sulfate.

2. The nanofertilizer of claim 1, wherein the metal nanoparticle is selected from the group consisting of gold, silver, copper, aluminum, nickel, chromium, iron, cobalt, tin, titanium, silicon, zinc, lead, platinum, palladium, rhodium, tantalum, ruthenium, tungsten, an alloy thereof and a combination thereof.

3. The nanofertilizer of claim 1, wherein the nanofertilizer is in an aqueous solution.

4. The nanofertilizer of claim 1, wherein the at least one nanoscale plant nutrient is releasable from the nanofertilizer.

5. The nanofertilizer of claim 1, wherein the at least one nanoscale plant nutrient is nanoscale ammonium sulfate and the metal nanoparticle is silver.

6. The nanofertilizer of claim 1, wherein the at least one nanoscale plant nutrient is nanoscale ammonium sulfate in the amount of about 0.001 ppm to about 2.0 ppm of the total weight of the nanofertilizer.

7. The nanofertilizer of claim 1, wherein the nanofertilizer is capable of being transported through the plant cell plasma membrane without mediation of complex polysaccharides and without ATP energy.

8. A nanofertilizer comprising a silver nanoparticle coated with boric acid.

9. The nanofertilizer of claim 8, wherein the boric acid is present in the amount of about 0.001 ppm to about 2.0 ppm of the total weight of the nanofertilizer.

10. The nanofertilizer of claim 8, wherein the size of the nanoparticle is in the range of 10-1000 nanometers.

11. The nanofertilizer of claim 8, wherein the ratio of boric acid to silver is from about 1:2 to about 2:1 w/w.

* * * * *